March 8, 1955  G. V. HUTCHINS  2,703,659
HIGHWAY AND RAILROAD TRAILER BODY
Filed Nov. 3, 1952  3 Sheets-Sheet 1

George V. Hutchins
INVENTOR
by Edward C. Taylor
ATTORNEY

March 8, 1955
G. V. HUTCHINS
2,703,659
HIGHWAY AND RAILROAD TRAILER BODY
Filed Nov. 3, 1952
3 Sheets-Sheet 2
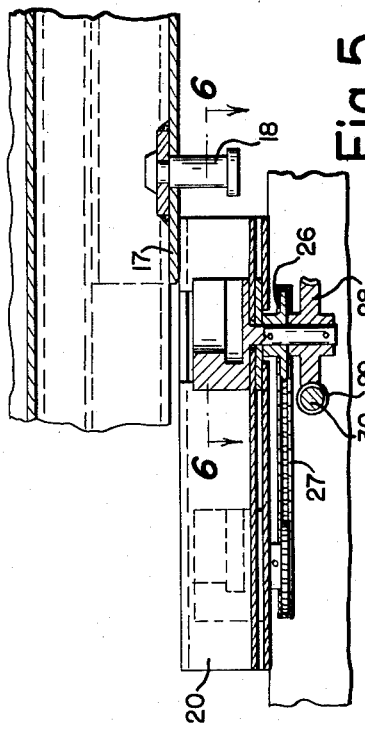
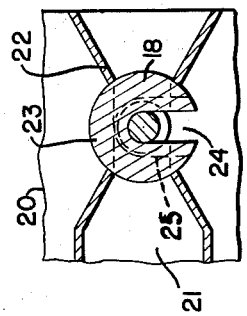
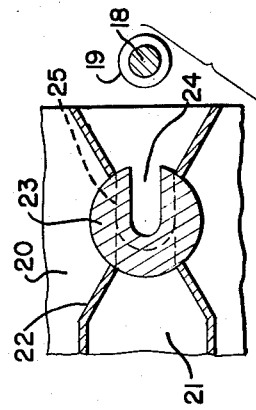
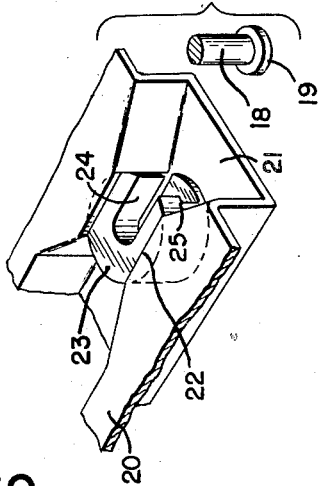
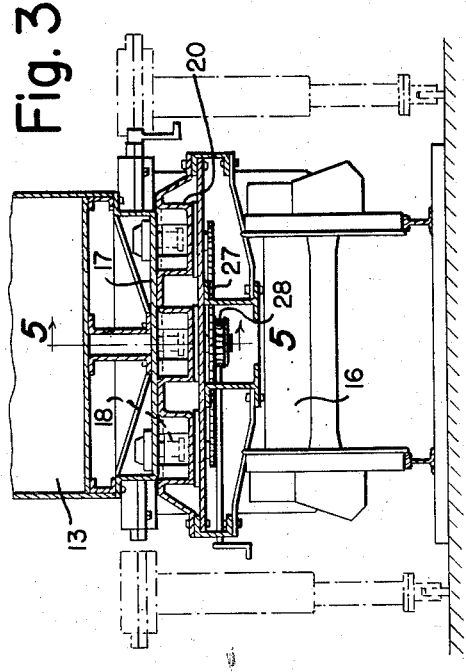
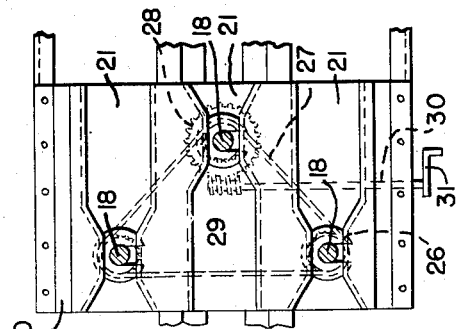
George V. Hutchins
INVENTOR
Edward C. Taylor
ATTORNEY March 8, 1955  G. V. HUTCHINS  2,703,659
HIGHWAY AND RAILROAD TRAILER BODY
Filed Nov. 3, 1952  3 Sheets-Sheet 3
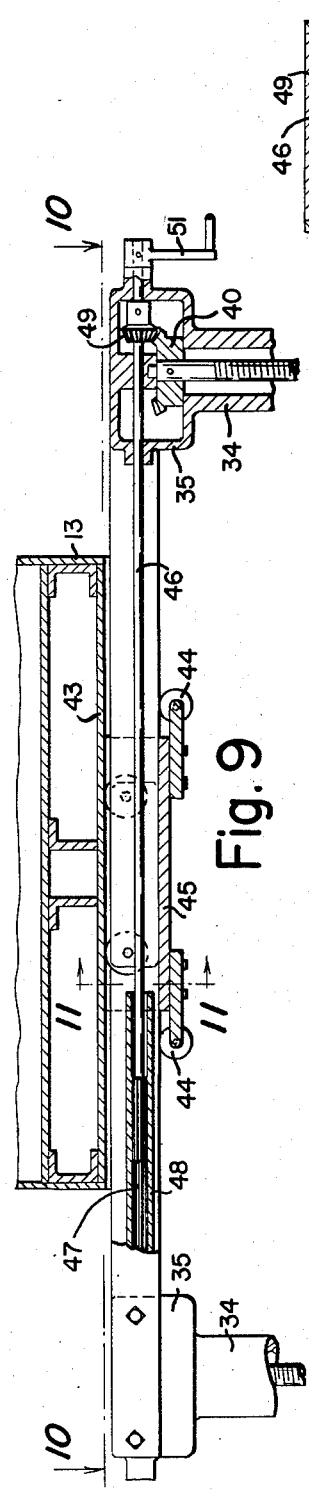
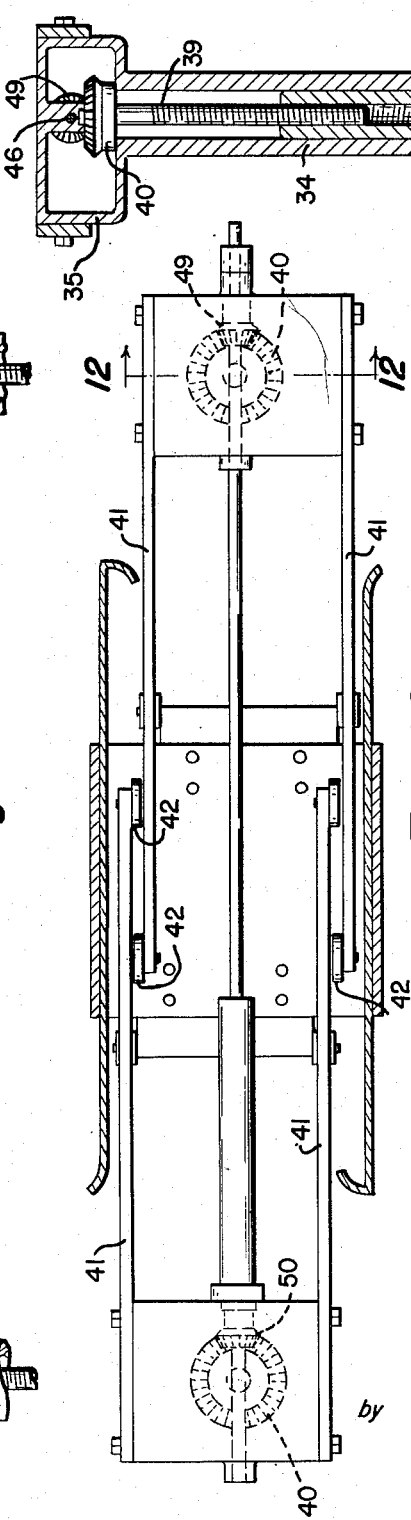
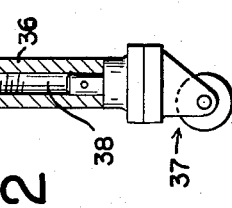
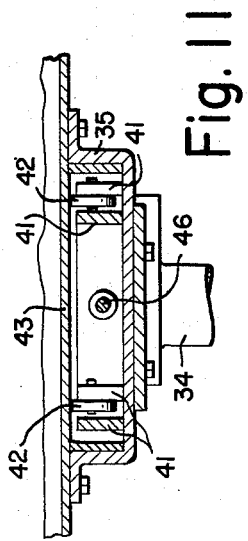
George V. Hutchins
INVENTOR
by Edward C. Taylor
ATTORNEY United States Patent Office 2,703,659
Patented Mar. 8, 1955

2,703,659

HIGHWAY AND RAILROAD TRAILER BODY

George V. Hutchins, North Hero, Vt.

Application November 3, 1952, Serial No. 318,452

5 Claims. (Cl. 214—515)

This invention relates to a trailer body which is adaptable to be towed along a highway by the usual type of trailer tractor or to be carried on a railroad flat car. It is well known that highways are not as suitable as railroads for the transport of heavy loads for long distances, and that the ideal arrangement would be that trucking would be restricted to the gathering together of shipments from points away from the railroads and transporting them to focal rail points. Hitherto, however, the necessity of reloading the shipment upon its transfer to rail and a subsequent reloading at a focal rail point near its ultimate destination has proved too costly to make the combined highway-rail shipment practical. Attempts have been made to provide containers for part of the normal trailer load which could be transferred to rail, but as far as I am aware no practical method has been proposed of making a trailer entirely transferrable to a flat car without excessive cost and labor.

It is one object of the present invention to provide a trailer body with an adaptable connection by which it may be attached alternatively to an axle bearing a pair of highway wheels and to a tractor, or to a railway flat car. It is a further object of the invention to provide temporary supporting means for the trailer body while it is being changed from highway to rail transport or vice versa. Additional objects will appear from the following description and claims.

The invention will now be described with reference to the accompanying drawings, in which:

Fig. 3 is a section on line 3—3 of Fig. 2;

Fig. 4 is a section on line 4—4 of Fig. 2;

Fig. 5 is a section, on an enlarged scale, taken on line 5—5 of Fig. 3;

Fig. 6 is a section on line 6—6 of Fig. 5;

Fig. 7 is a view similar to Fig. 6 but showing the parts in the position in which they are locked together;

Fig. 8 is a perspective view showing the relationship of the members shown in Figs. 6 and 7;

Fig. 9 is an enlarged section on line 9—9 of Fig. 2 showing the mounting of the dollies which support the trailer body while it is being transferred from one means of transportation to another;

Fig. 10 is a section on line 10—10 of Fig. 9;

Fig. 11 is a section taken on line 11—11 of Fig. 9; and

Fig. 12 is a section on line 12—12 of Fig. 10.

Figure 1:
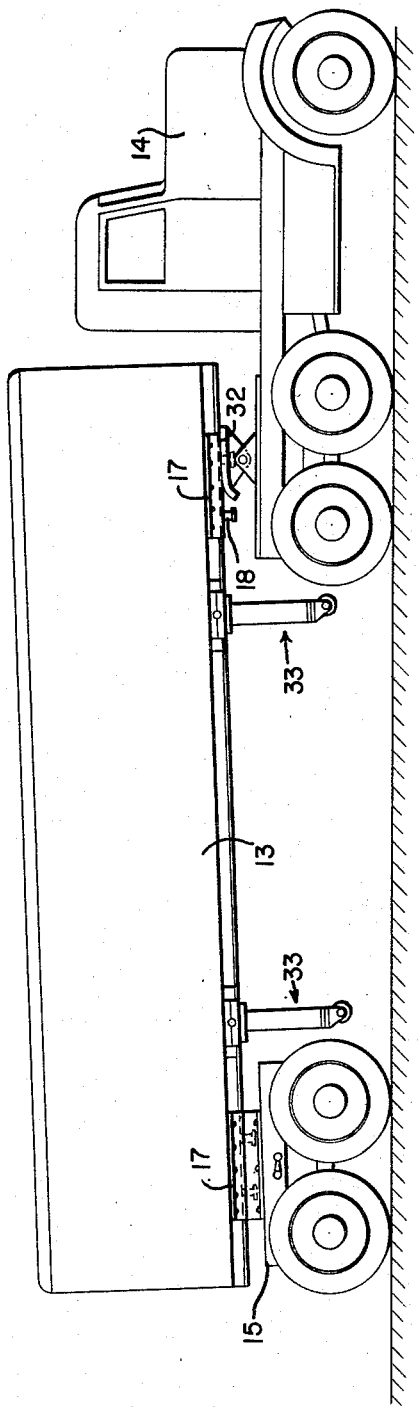
Fig. 1 is a side elevation of the trailer body mounted for highway transport.
Figure 2:
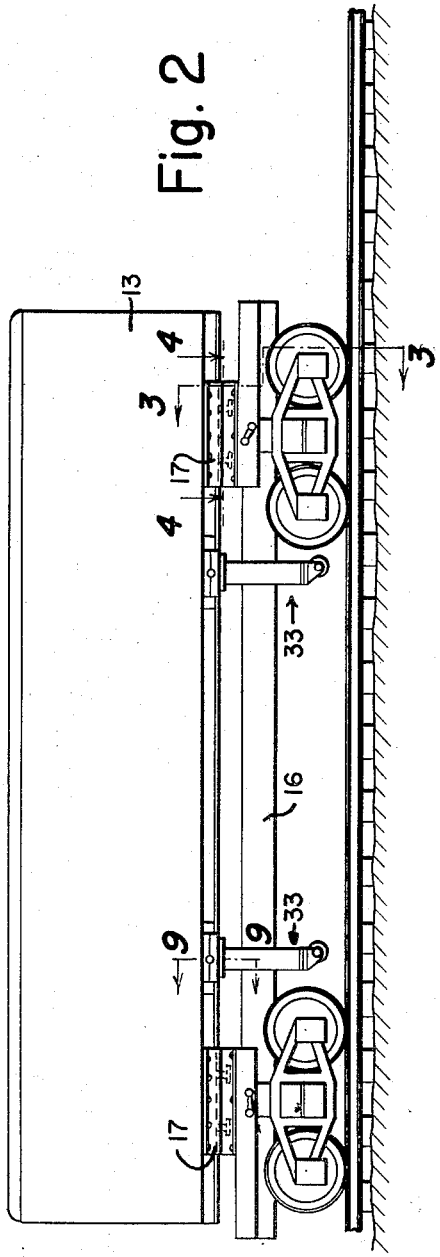
Fig. 2 is a similar view of the trailer body mounted for rail transport.

The trailer body 13, which in general can be of any desired construction, is shown in Fig. 1 as being supported on the front end by a tractor 14 and on the rear end by a dual wheel assembly 15; and in Fig. 2 as being supported on a flat car 16. The details of the flat car, other than the structure by which the trailer body is held to it, are not a part of my invention and therefore have not been illustrated in detail. The usual wooden deck is not necessary, but the connecting mechanism may be mounted on it if desired.

On each end of the trailer body there is a plate structure 17 secured to the bottom of which are three pins 18 in a triangular set having heads 19 at their lower ends. The use of exactly three pins is not necessary, but as will be explained below insures stability of the connection and also lends itself to making the usual "fifth wheel" connection between the trailer body and the tractor. The plate structure and the pins remain in place on the trailer body at all times, whether the trailer is attached to the tractor, the flat car, or is supported on its dollies for transfer from one to the other. The cooperating attachment device, which is mounted on the dual wheel assembly for highway use (but not on the tractor) and on both ends of the flat car, is shown as a corrugated metal structure 20 having three channels 21. Each channel has a constricted zone 22 in which a rotatable cylinder 23 is mounted. Each cylinder has a slot 24 which receives a pin 18, the slots being enlarged at 25 to permit entrance of the head of the pin. When the cylinders are rotated from the position of Fig. 6, in which the slot is in line with the channel for easy entrance or exit of the pin, to the position of Fig. 7, in which the slot is at right angles to the channel, the pin will be securely locked in position. It cannot move along the channel because of the crosswise position of the slot, and cannot move vertically on account of the head of the pin being engaged within the enlargement 25.

In order that the cylinders 23 may be rotated simultaneously and all kept with their slots in the same relative position each is provided with a sprocket 26 around which passes a chain 27 coupling the three cylinders together. One of the cylinders has a worm gear 28 meshing with a worm 29 on a shaft 30 provided with a handle 31. By rotating the handle the cylinders may be set with their slots all in line with the channels, which serve as guides to direct the pins 18 on the trailer body into the slots, and when the pins are engaged within the slots the cylinders may be rotated into the right angled position of Fig. 7 to hold the pins in place. When the trailer body is to be mounted on the tractor for highway travel the rear wheel assembly is attached as described, but the front pin only of the triangular assembly at the front of the trailer is used. This is so that the tractor and trailer may pivot relatively to each other as is usual. The front pin fits into a fore and aft slot extending partway through a rocking plate 32 on the tractor, and the slot is then closed as is customary. The coupling to the tractor is conventional, and therefore has not been illustrated in detail.

During the transition from the mounting on the different types of wheels the trailer body has to be supported. In this case the conventional dolly has been modified in two particulars. In the first place it is duplicated on both ends of the trailer body so that the latter can be supported wholly independently of the wheels on which it normally travels. In the second place the dollies 33 are formed of caster supports which can be shifted either inwardly so as not to form a projection at the side of the trailer or outwardly so as to clear the wheel assembly or flat car upon which the trailer body is to be mounted, or from which it is to be removed. Each caster support is formed of a tube 34 extending downwardly from a housing 35 and receiving telescopically within it a second tube 36 having a caster 37 at the bottom. The inner tube 36 has a threaded bore 38 into which fits a screw 39. At its upper end each screw 39 is secured to a bevel gear 40 within the housing 35. The two housings 35 in each pair are mounted for movement laterally of the trailer body on rails 41 provided with rollers 42. These rollers bear on the bottom of a plate 43 carried by the trailer body, and the rails themselves ride on rollers 44 carried by a plate 45 also secured to the trailer body. The two caster supports of each pair can thus be pushed towards or away from the trailer body as may be required by the separation of the wheels to which the trailer body is to be attached or the terrain on which the trailer body is located.

When the caster supports are properly located laterally the inner tubes 36 can be screwed down manually until each caster makes contact with the ground, and then the two casters of a pair are moved simultaneously by rotating the bevel gears 40. For this purpose there is provided a cross shaft 46 having a splined connection 47 with a tube 48. Shaft 46 carries a bevel pinion 49 meshing with one of the bevel gears 40, and the tube 48 has a bevel pinion 50 meshing with the other, so that when the shaft 46 is rotated as by a handle 51 both casters of the set will be lowered simultaneously.

What I claim is:

1. A trailer body having at each end a triangular set of downwardly projecting pins having enlarged heads, one or more structures for mounting on a highway wheel axle or on a railway flat car and having converging guideways to receive the pins of a set, and a set of slotted cylindrical blocks rotatable within said guideways and each having an enlarged slot at the bottom to receive the head of a pin.

2. A trailer body having at each end a triangular set of downwardly projecting pins having enlarged heads, one or more structures for mounting on a highway wheel axle or on a railway flat car and having converging guideways to receive the pins of a set, a set of slotted cylindrical blocks rotatable within said guideways and each having an enlarged slot at the bottom to receive the head of a pin, a chain and sprocket connection between the several blocks of a set, a shaft having an operating handle at one end, and a worm and gear connection between the shaft and one of the blocks.

3. A trailer body having at each end a triangular set of downwardly extending pins, one or more structures for mounting on a highway wheel axle or on a railway flat car to receive the pins of a set, means for clamping the pins and said structure together, and laterally and vertically adjustable dollies at each end of the trailer body to take the load of the trailer while said clamping means is being connected or disconnected.

4. A trailer body having at each end a triangular set of downwardly projecting pins having enlarged heads, one or more structures for mounting on a highway wheel axle or on a railway flat car and having converging guideways to receive the pins of a set, a set of slotted cylindrical blocks rotatable within said guideways and each having an enlarged slot at the bottom to receive the head of a pin, and laterally and vertically adjustable dollies at each end of the trailer body to take the load of the trailer body while said pins and blocks are being connected or disconnected.

5. A trailer body having at each end a triangular set of downwardly projecting pins having enlarged heads, one or more structures for mounting on a highway wheel axle or on a railway flat car and having converging guideways to receive the pins of a set, a set of slotted cylindrical blocks rotatable within said guideways and each having an enlarged slot at the bottom to receive the head of a pin, a chain and sprocket connection between the several blocks of a set, a shaft having an operating handle at one end, a worm and gear connection between the shaft and one of the blocks, and laterally and vertically adjustable dollies at each end of the trailer body to take the load of the trailer while said blocks are being connected to or disconnected from said pins.

References Cited in the file of this patent

UNITED STATES PATENTS

| | | |
|---|---|---|
| 1,889,939 | Thomas | Dec. 6, 1932 |
| 1,922,359 | Edwards | Aug. 15, 1933 |
| 2,172,244 | Grundler | Sept. 5, 1939 |
| 2,304,622 | Barrett | Dec. 8, 1942 |
| 2,590,962 | Gurton | Apr. 1, 1952 |

FOREIGN PATENTS

| | | |
|---|---|---|
| 12,392 | Great Britain | Jan. 23, 1885 |